United States Patent [19]
Sabel

[11] Patent Number: 4,492,580
[45] Date of Patent: Jan. 8, 1985

[54] WEIGHT-LOSS MOTIVATION KIT

[76] Inventor: Herbert J. Sabel, 543 Avenue Del Oro, Sonoma, Calif. 95476

[21] Appl. No.: 594,744

[22] Filed: Mar. 30, 1984

[51] Int. Cl.³ .............................................. G09B 19/00
[52] U.S. Cl. .................... 434/127; 434/430; 40/539
[58] Field of Search ............... 434/127, 430, 191, 200; 40/539

[56] References Cited

U.S. PATENT DOCUMENTS

| | | | |
|---|---|---|---|
| 1,385,834 | 7/1921 | Kellogg | 40/539 |
| 2,076,375 | 4/1937 | Krudener | 40/539 |
| 3,629,960 | 12/1971 | Rousch | 434/430 X |
| 4,011,671 | 3/1977 | Fogel et al. | 434/430 |
| 4,045,897 | 9/1977 | Gates | 434/430 X |
| 4,112,598 | 9/1978 | Maass et al. | 434/430 |
| 4,310,316 | 1/1982 | Thomann | 434/127 |
| 4,440,396 | 4/1984 | Frudakis | 434/127 X |

FOREIGN PATENT DOCUMENTS 1007998  2/1952  France ................. 434/200

*Primary Examiner*—William H. Grieb
*Attorney, Agent, or Firm*—Owen, Wickersham & Erickson

[57] ABSTRACT

A device for motivating dieters to maintain a program for weight loss. A planar board with foldable portions to support it in an upright position and having printed indicia forming a plurality of spaces designating progressively the number of pounds that a dieter wishes to lose during a weight loss program. In combination with the board are foldable cartons whose size on one end are related to each space on the board. When a dieter commences a weight-reduction program, a number of cartons equalling the number of pounds to be lost are stacked against the indicia of the board to coincide with the designated spaces. For each pound that the dieter loses, he or she is entitled to remove one carton, unfold it and place it in a flat carton holder in the rear of the board.

5 Claims, 4 Drawing Figures

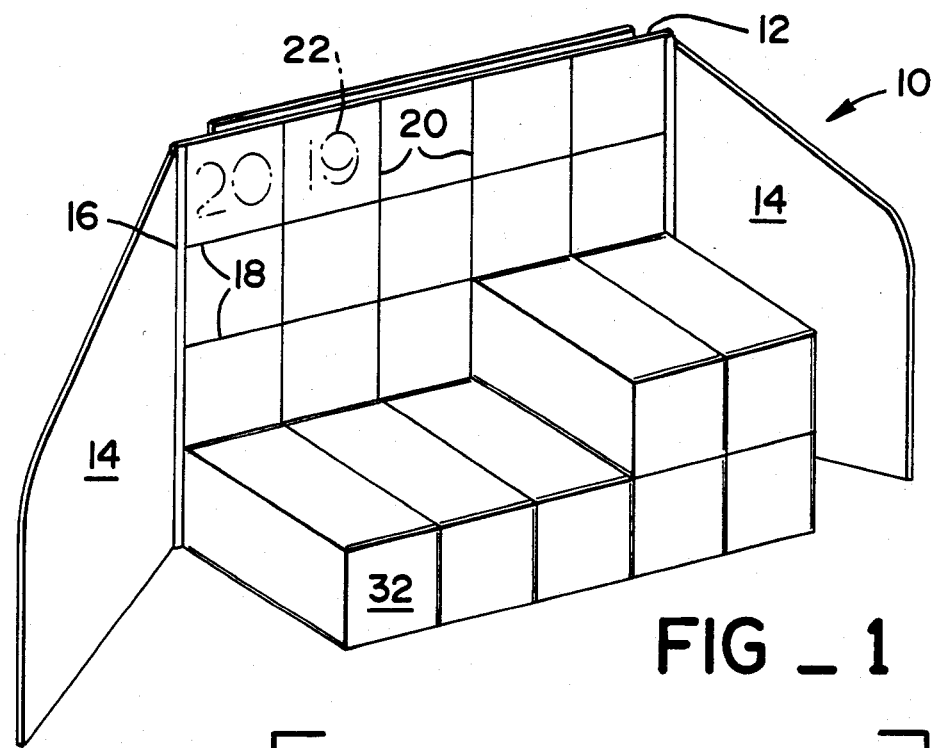
FIG _ 1
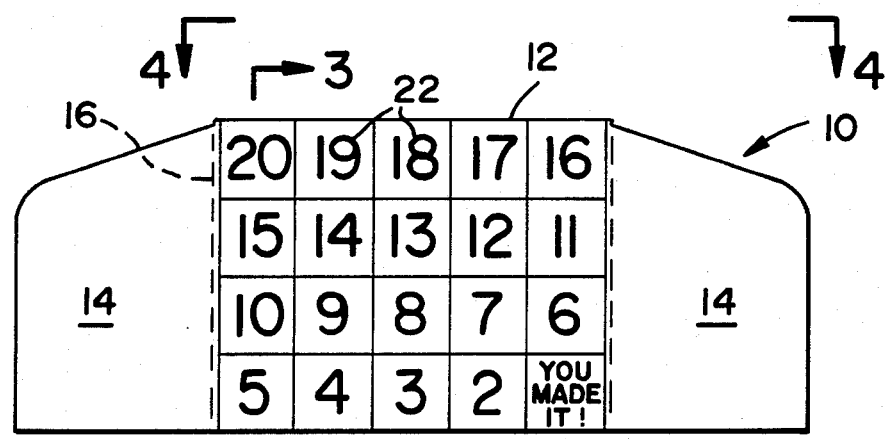
FIG _ 2
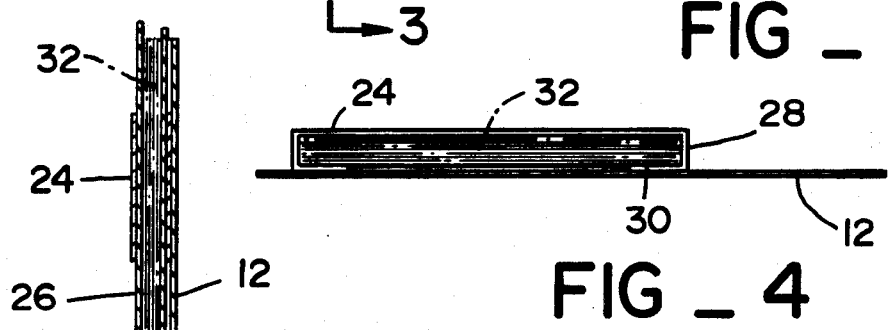
FIG _ 3
FIG _ 4

WEIGHT-LOSS MOTIVATION KIT

This invention relates to a device for motivating a person in a weight-loss program, and more particularly a device that provides a visual representation of the number of weight units as well as the approximate cumulative bulk of such weight units that a dieter is attempting to lose.

BACKGROUND OF THE INVENTION

There are many variations of weight-loss programs involving dieting and exercising that have been devised. Such programs often produce different results for different persons, one reason being that the "motivation factor", that is, the desire and ability to maintain the program to its successful completion, can vary greatly. Heretofore, a common form of record keeping during a dieting program, was to record variations in the dieter's weight on a chart at selected intervals. Other more recent attempts at motivating dieters have involved the use of complicated electronic scale devices utilizing comparative readouts or audio reports aided by a computer memory.

A general object of the present invention is to avoid such complexity and expense by providing a relatively simple device with a high degree of dieting motivation using a unique form of representative visual display.

Another object of the invention is to provide a rough approximation of the bulk or volume of the weight which a dieter wished to remove and to relate such bulk in increments that can be diminished in a visual representation as the dieter gradually loses weight in a weight-reduction program.

Other objects of the invention are to provide a weight reduction monitoring and motivation device that provides a visual representation of both the number of pounds as well as the approximate bulk of such pounds that are sought to be lost, and also such a device that is portable, easy to set up and inexpensive to manufacture.

SUMMARY OF THE INVENTION

In the form disclosed, the present invention comprises a display board having attached end portions that extend outwardly from it and enable it to be held in an upright position on a flat surface such as the top of a table or dresser. On its inside surface, the board is marked with horizontal and vertical lines to form a series of squares or rectangles and indicia is provided within each one to indicate one pound of body weight. On the rear side of the board is a holder for retaining a series of flat, foldable cartons. Each carton is preferably of a size normally used for packaging one pound of lard or margarine which are products that symbolically represent unwanted human fat. The end dimensions of each carton, when erected, are substantially the same as those of each square or rectangle defined on the board. Thus, a preselected number of cartons, when erected, may be stacked against the board between its end portions to represent the aggregate amount of weight that a dieter wishes to lose when commencing a diet program. As the dieter is weighed at intervals, one carton may be removed as each one pound reduction in weight occurs, the object being to eliminate all of the stacked cartons during the weight reduction program. Since each carton roughly represents one pound of the dieter's weight as well as bulk, there is a visual incentive to pursue the diet program and continue to remove such unsightly bulk. As each pound is removed, the representative carton is unfolded from its erected configuration and is replaced in flat form to the holder portion on the rear of the board. Naturally, if the dieter regresses and adds weight, a new carton must be erected and added to the stack, and the dieter's lack of progress becomes more visually apparent. The indicia within the squares on the upright board can be mere numbers to indicate the number of pounds yet to lose or it can include other comments or information which will furnish further motivation to the dieter.

Other objects, advantages and features of the invention will become apparent from the following detailed description of one embodiment thereof, presented in conjunction with the accompanying drawing.

BRIEF DESCRIPTION OF THE DRAWING

FIG. 1 is a view in perspective of a weight-loss motivation device according to the present invention.

FIG. 2 is a front view in elevation of the display board for the device of FIG. 1.

FIG. 3 is a view in section taken along line 3—3 of FIG. 2.

FIG. 4 is a fragmentary top view taken along line 4—4 of FIG. 2.

DETAILED DESCRIPTION OF EMBODIMENT

With reference to the drawing, FIG. 1 illustrates a weight-loss motivation device 10 as it appears when assembled for use. In general, it comprises an upright display board 12 which is made of a suitable sheet material such as a heavy cardboard, wood or plastic. The board is rectangular in shape and attached to each end is a movable support member 14 that is connected thereto by a suitable hinge 16 which may be merely a scored line on cardboard or a strip of flexible material, if more rigid sheet material is used for the board. Thus, the support members 14 can be moved to an angular position relative to the board to retain it in an upright position on a flat surface.

On the front surface of the display board, a series of equally spaced apart horizontal lines 18 are provided together with a series of spaced apart and intersecting vertical lines 20. These lines 18 and 20 form indicia comprising a series of squares or rectangles, and within each rectangle is a preselected indicia or number 22. These numbers in each rectangle represent an equal number of pounds that a dieter wishes to remove, and these numbers decrease in consecutive order from the top row of rectangles to the bottom row. For example, in the embodiment shown in FIGS. 1 and 2, the upper left hand rectangle, when viewing the board, has the number "20" and in each of four rows of rectangles, the numbers are reduced by one in consecutive order, so that the lower right hand square has the number "1" or a short statement that the dieter's goal has been achieved.

Attached to the back or rear side of the display board 12 is a holder member 24 for retaining a semi-rigid folder 26. As seem in FIG. 3, this holder member 24 has a central portion made of sheet material such as cardboard and end portions 28 preferably secured to the display board by flanges 30 using a suitable adhesive or the like. Retained within the holder is the folder 26 which is U-shaped in cross section as seen in FIG. 3. This folder is utilized for retaining a supply of flat foldable cardboard cartons 32, preferably the same number as the number of rectangles indicated on the board.

Each carton, made of relatively light cardboard material, is foldable into a carton 32 which has preferably the same size as commercially available, foldable cartons used for lard, margarine or other like products. Such products having roughly the same density of body fat, thus provide a visual approximation of the bulk associated with one pound of body weight. Each carton when erected has an oblong shape and the dimensions of its end surfaces are subtantially identical to those of the rectangles on the board. Thus, the cartons 32, when erected, may be stacked in orderly rows on top of each other, as shown in FIG. 1, so that each carton covers a rectangle on the board and the number of cartons provided may equal the number of rectangles on the board.

In use, a dieter may set up the device 10 at any convenient location which is readily accessible and viewable so as to serve as a reminder of its significance. When commencing a weight-loss program, the dieter first determines the number of pounds he or she intends to lose before the program is successfully completed. For each pound to be lost, the dieter erects a foldable carton 32 and then stacks the carton on top of each other against the display board 12 in the order shown in FIG. 1. This stack of cartons thus represents not only the number of pounds that are desired to be removed but also a rough approximation of the total bulk of fat that the same number of pounds represents. Now, each time the dieter checks his weight (whether it is once each day or each week), when a scale reading indicates a weight loss of one pound, the dieter is entitled to remove one carton 32, unfold it and place it within the folder 26. As the diet continues, the motivation of the dieter to maintain a weight-losing regimen is increased when he or she sees the representative reduction in bulk, as well as weight, as the number of cartons is reduced with each pound lost. Although a relatively simple correlation of weight and bulk is provided, the device 10 provides a psychological incentive that may comprise the most important motivating factor to successful completion of a weight-loss program.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A device for motivating dieters to maintain a weight-loss program, comprising a display board with indicia on its front side forming an array of spaces each with a symbol therein indicating a preselected number of pounds that the dieter must lose in a diet program;

a plurality of foldable cartons for use with said display board each carton being symbolic of a pound of removable human weight and, when erected, having end surfaces with substantially the same dimensions as one of said array of spaces, a number of said cartons being stacked against said board to cover a like number of spaces;

whereby each time a user of said device is weighed during a weight-loss program, a said carton is removed for each pound lost or a said carton is added for each pound gained from the dieter's previous weight measurement.

2. The device as described in claim 1 including a means attached to the rear side of said board for retaining a plurality of said foldable cartons in the knocked-down flat condition.

3. The device as described in claim 1 including foldable support portions attached to opposite ends of said board for holding it in an upright position on a flat surface.

4. The device as described in claim 1 wherein said array of spaces on said board is formed by a series of spaced apart horizontal lines intersected by spaced apart vertical lines to form rectangles of similar dimensions, and numerals in said rectangles which decrease sequentially from a top row of rectangles to a bottom row.

5. A method for providing motivation in maintaining a weight-reduction program comprising the steps of:
a. providing a display board with indicia on one side including a series of rows of rectangular spaces, each space having a numeral representing the number of pounds yet to be lost in the dieter's program;
b. erecting a series of foldable cartons, one for each of said rectangular spaces, each of said cartons having approximately the same volume as one pound of lard or margarine to symbolically represent one pound of the dieter's weight;
c. arranging said erected cartons in a stack against said board to cover a said rectangle and its numeral;
d. providing initially the same number of erected cartons as the number of pounds which the dieter intends to lose during the weight reduction program;
e. weighing the dieter periodically;
f. removing an erected carton from said stack for each pound that the dieter loses at each periodic weigh-in or adding a new erected carton to said stack for each pound that the dieter may have gained.

* * * * *